Aug. 23, 1966
D. TANN
3,268,638
METHOD OF EXTRUDING OIL-IMPREGNATED FIBERS INTO BEARING RESERVOIRS
Filed Feb. 19, 1963
3 Sheets-Sheet 1
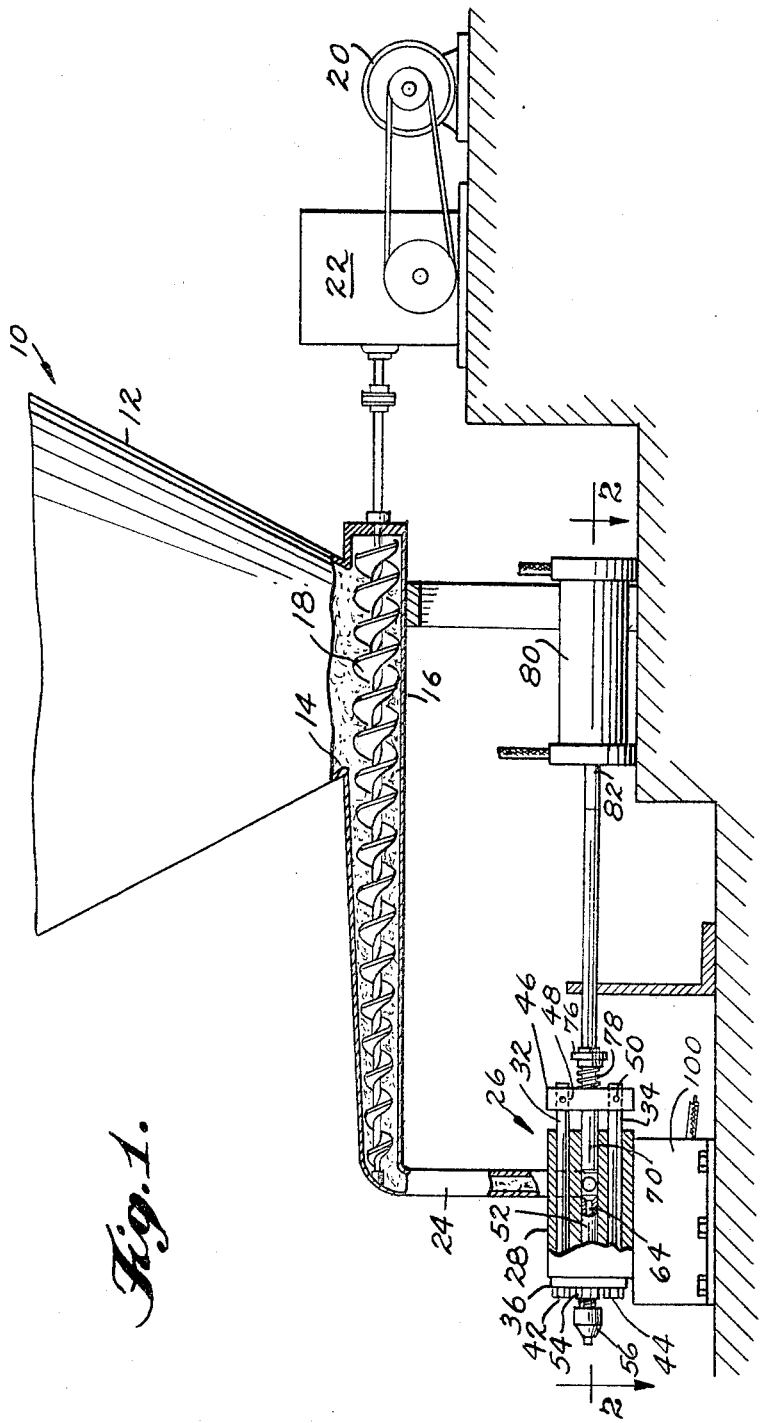
INVENTOR.
DAVID TANN
BY
Lane, Aitken, Dunner & Ziems
ATTORNEYS

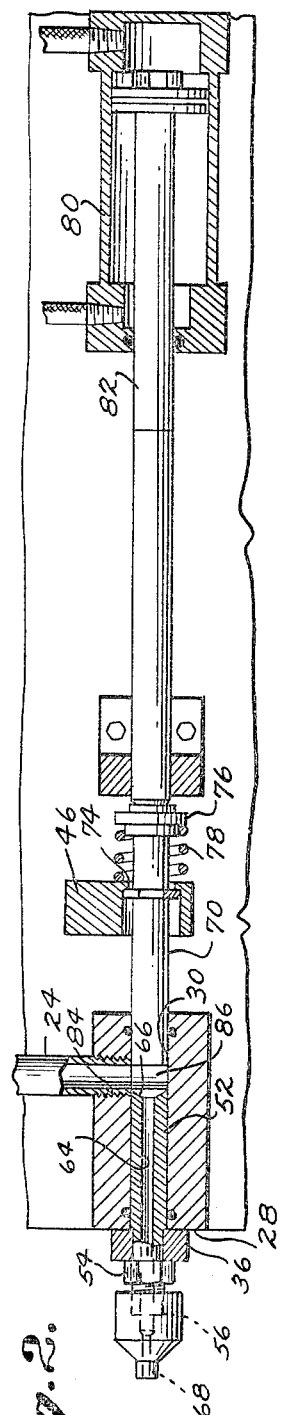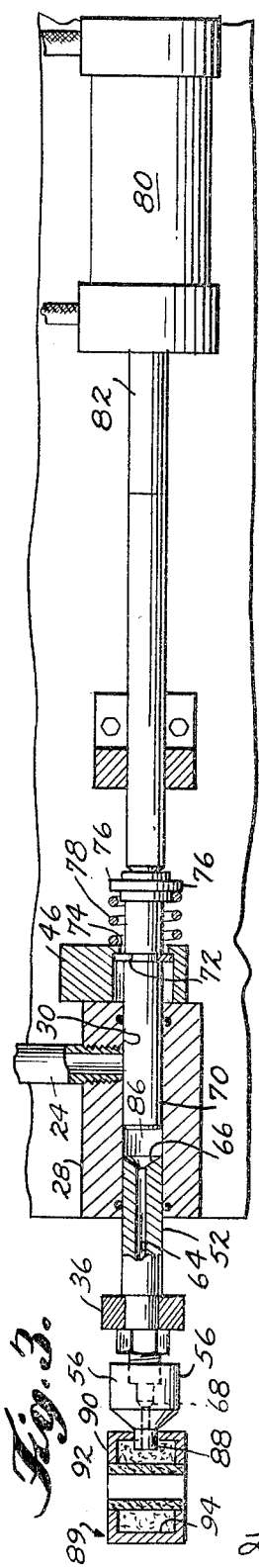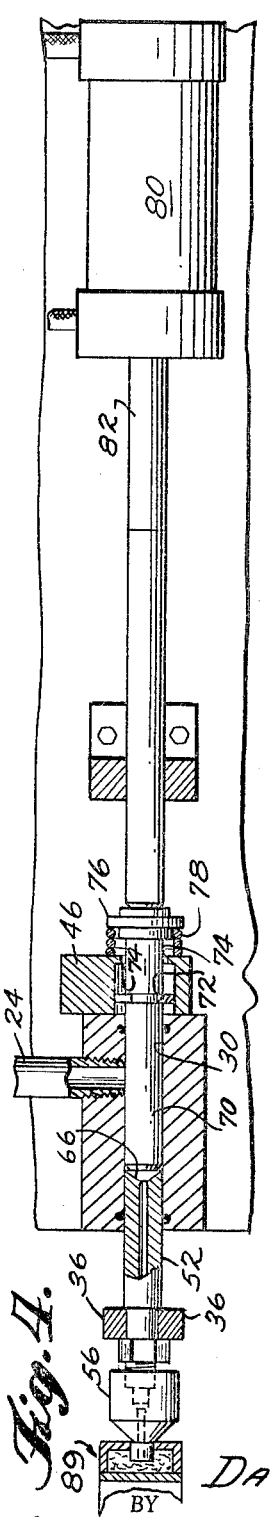
INVENTOR.
DAVID TANN
BY
Lane, Aitken, Dunner & Ziems
ATTORNEYS

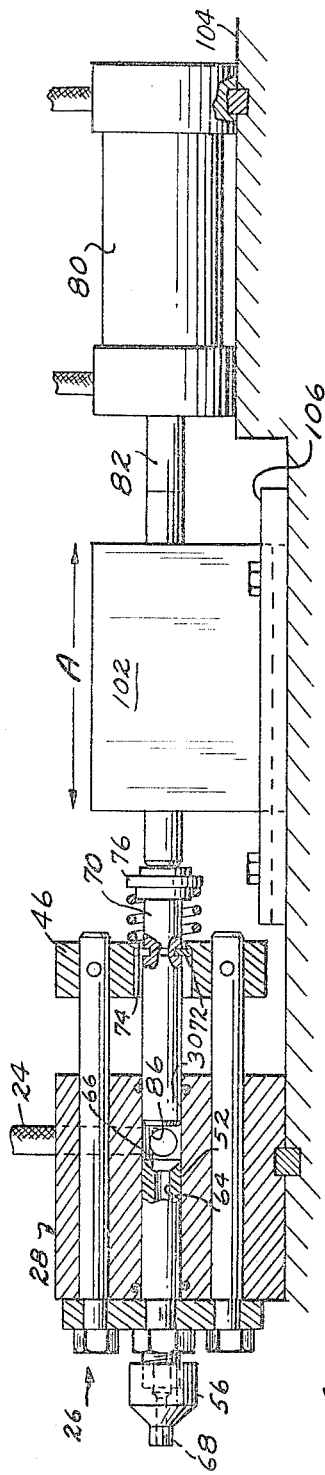

United States Patent Office 3,268,638
Patented August 23, 1966

3,268,638
METHOD OF EXTRUDING OIL-IMPREGNATED FIBERS INTO BEARING RESERVOIRS
David Tann, Detroit, Mich., assignor to Permawick Company, Detroit, Mich., a company of Michigan
Filed Feb. 19, 1963, Ser. No. 259,589
1 Claim. (Cl. 264—69)

This invention relates to a method of extruding oil-impregnated fiber mixtures into bearing reservoirs and more particularly whereby such extrusion is facilitated by vibrating an extrusion apparatus.

These mixtures have a tendency to separate when pressurized, as for example when extruded or injected under pressure.

Because of the tendency of these mixtures to separate, the injecting or extruding pressure applied thereto must be very carefully controlled so that it does not exceed a predetermined limited value.

In accordance with the present invention, it has been found that the tendency of these mixtures to separate when injected or extruded under pressure can be overcome to a remarkable extent by exposing them to vibration as they are being injected or extruded. The vibration can be provided by any suitable electrical or mechanical vibrating means arranged either to vibrate the entire injecting or extruding device or to vibrate the pressure-applying element of the device. More specifically, if the mixture is being injected or extruded by a piston operating in a cylinder, for example, either the entire cylinder may be vibrated or the vibrations may be applied directly to the piston as it is advanced to expel the mixture from the cylinder. It has been found that the application of vibration in this manner maintains the mixture thoroughly mixed despite increased injecting or extruding pressures, or alternatively the mixture itself can be altered in a manner to provide an improved end product which cannot be handled satisfactorily by prior injecting and extruding apparatus without vibration.

Accordingly, it is one object of the present invention to improve the capability of mixtures of materials to be handled under pressure without separation.

It is another object of the invention to provide an extrusion apparatus which is vibrated during operation in a manner to prevent the separation of the mixture being extruded.

It is a further object of the invention to provide an injection and metering device for injecting metered amounts of a mixture of materials which is vibrated during operation to prevent the mixture from separating.

It is a still further object of the invention to vibrate a mixture of materials as it is extruded to enable a greater extrusion pressure to be applied to the mixture without causing separtaion, or to enable mixtures to be extruded at the same pressure which could not be extruded satisfactorily without vibration.

Further objects and features of novelty of the present invention will be specifically pointed out or will otherwise become apparent when referring, for a better understanding of the invention, to the following description taken in conjunction with the accompanying drawings, wherein:

FIG. 1 is a sectional view of apparatus illustrating one embodiment of the present invention;

FIG. 2 is a sectional view taken along the line 2—2 of FIG. 1;

FIG. 3 is a sectional view similar to FIG. 2 showing the injecting and metering device in an intermediate advanced position;

FIG. 4 is a sectional view similar to FIG. 2 showing the injecting and metering device in its completely advanced position;

FIG. 5 is a side view of the injecting and metering device as illustrated in FIG. 2 in combination with a vibrator for vibrating the piston of the metering device; and FIG. 6 is a sectional view of another embodiment of the present invention.

Referring to FIG. 1 an apparatus 10 is shown which illustrates one embodiment of the present invention for injecting metered amounts of the extrudable wicking material mixed with oil mentioned above and described in Patent No. 2,966,459, issued to Martin L. Abel on December 27, 1960. However it is to be understood that the principles of the invention as disclosed by this embodiment are applicable to other mixtures of materials which tend to separate when extruded, injected or pumped under pressure as mentioned at the outset of this specification.

This extrudable wicking material briefly comprises small cellulose fibers mixed with oil at a ratio of approximately eight parts by weight of oil to one part of fibers. An important use of this extrudable wicking material is for lubricating fractional horsepower motor bearings which were formerly lubricated by oil impregnated felt rings. The felt rings had to be hand assembled whereas the extrudable wicking material can be injected directly into lubricant reservoirs or cavities surrounding the bearings to provide long lasting lubrication for the bearings. The apparatus 10 enables the extrudable wicking material to be injected at a greater pressure without a separation of the oil from the fibers, or alternatively, it enables a mixture of fibers and oil to be employed which could not be satisfactorily injected prior to the present invention as will be seen from the following description.

The apparatus 10 comprises a hopper 12 for storing the extrudable wicking material and delivering it to an opening 14 in the upper rear portion of an auger casing 16 to supply the wicking material directly to an auger 18 rotatably journaled within the casing. The auger 18 is rotated by an electric motor 20 through a clutch 22 which causes the auger to rotate through a predetermined angle each time the motor 20 is energized for a purpose to be described in greater detail hereinafter. The forward end of the auger 18 has a reduced pitch to insure that the auger is completely filled with the wicking material when it is delivered to a conduit 24 which connects the forward end of the casing 16 with a metering and injecting device 26.

Referring to FIG. 2 as well as FIG. 1, the metering and injecting device 26 comprises a block 28 having a central passageway 30 extending therethrough. A pair of studs 32 and 34 are slidably supported in the block 28 with the forward ends thereof interconnected by a front plate 36. The plate 36 is locked in position against shoulders 38 and 40 on the studs 32 and 34, respectively, by nuts 42 and 44. The rear ends of the studs are fixed to a rear plate 36 by pins 48 and 50. A first piston 52 is slidably positioned within the bore 30 and projects through the plate 36 with a nut 54 on the threaded end thereof to fix the first piston 52 to the plate. An injection nozzle 56 is screwed onto the threaded end of the first piston 52 forwardly of the nut 54. The piston 52 has a central passageway 64 extending therethrough which communicates with a truncated conical recess 66 in the rear end of the piston and with a small outlet orifice 68 in the injection nozzle 56.

A second piston 70 extends through and is supported by the rear plate 46 with the forward end thereof slidably projecting into the bore 30. A snap ring 72 or the like is fixed on the second piston 70 and cooperates with a lip 74 on the rear plate 46 to limit movement of the second piston relative to the plate 46 in one direction. A stop collar 76 is fixed on the end of the second piston 70 to limit movement thereof in the other direction relative to the plate 46 with a spring 78 positioned between the stop collar and the plate to normally bias the second piston to the position illustrated in FIGS. 1 and 2. A suitable double acting hydraulic or air cylinder 80 is mounted rearwardly of the second piston 70 with the piston rod 82 thereof connected to the end of the second piston. The conduit 24 which communicates with the forward end of the auger casing 16 is connected to a port 84 in the block 28 which communicates with the cavity 86 between the adjacent ends of the first and second pistons to feed the extrudable wicking material directly into the cavity.

In operation the electric motor 20 and clutch 22 intermittently rotate the auger 18 through a predetermined angle 22 at controlled intervals so that the auger delivers just enough or slightly more material than necessary to fill the cavity 86 between the pistons 52 and 70. After the cavity is filled in this manner the cylinder 80 is actuated to advance both pistons to the position illustrated in FIG. 3 wherein the nose of the injection nozzle 56 projects into a small aperture 88 of a bearing 89 comprising a cylindrical housing 90 surrounding a sintered bushing 92 in a manner to define a lubricant reservoir 94 about the sintered bushing.

At this point the rear plate 46 engages the block 28 to stop the forward advancement of the injection nozzle 56 while the second piston 70 continues to advance to force the extrudable wicking material from the cavity 86, through the central passageway 64 and through the restricted outlet orifice 68 into the lubricant reservoir 94 to completely fill the reservoir with a metered amount of the wicking material determined by the size of the cavity 86. During the advancement of the second piston 70 relative to the first piston 52, the spring 78 is compressed between the stop collar 76 and the rear plate 46. Therefore, when the double acting cylinder 80 retracts, only the second piston 70 retracts with it until the snap ring 72 engages the lips 74 on the rear plate 46. At this point the first piston 52 and the injection nozzle 56 will be retracted along with the second piston back to the position illustrated in FIGS. 1 and 2.

By providing the disc-shaped recess 66 in the end of the first piston 52 a small amount of extrudable wicking material will remain between the pistons when they have reached the position illustrated in FIG. 4. When the pistons are retracted back to the position illustrated in FIGS. 1 and 2 and the cavity 86 is refilled with additional material, the residue within the disc-shaped recess 66 will be ejected through the central passageway 64 on the next stroke of the piston 70. With this arrangement no extrudable wicking material remains in the cavity over a repeated number of cycles so as to clog the device.

In accordance with the present invention the block 28 is mounted on a vibrator 100 so that the extrudable wicking material within the cavity 86 and the central passageway 64 will be continuously vibrated as the pressure is exerted thereon by the second piston 70 to extrude it through the small outlet orifice 68 into the lubricant reservoir 94 of the bearing. The vibrator 100 can be any suitable type of vibrator such as air operated or mechanical vibrator, but an electromagnetic vibrator which delivers higher frequency, lower amplitude vibrations is preferred. With this arrangement the pressure applied by the second piston 70 can be increased above the pressure that could be used without the vibration. Or in the case of the extrudable wicking material greater quantities of oil may be employed in the mixture, or longer fibers, or fibers of different materials may be employed to provide a variety of mixtures that could not be extruded satisfactorily through the metering and injecting device without the vibration. For some bearing applications these different varieties or types of wicking material are preferred, but prior to the present invention they could not be injected satisfactorily into the bearing reservoir without the oil separating or the longer fibers clogging.

Referring to FIG. 5 another embodiment of the present invention is illustrated in which the metering device 26 is provided as before with the conduit 24 connected thereto for supplying the injectible wicking material from the auger and hopper (not shown). The second piston 70 is actuated by the double acting hydraulic cylinder 80 as previously described, but in this embodiment a vibrator 102 is connected between the piston rod 82 of the hydraulic cylinder and the second piston 70 to vibrate the second piston in the direction of the arrow A as the piston is advanced to expel the material from the cavity. The vibrator 102 may be slidably mounted on the same base 104 that supports the cylinder 80 and the metering and injecting device 26, and its sliding movement guided by guide bars 106 fixed to the base 104 on opposite sides of the vibrator 102. If desired the control circuit (not shown) for controlling the cylinder 80 and the vibrator 102 can be arranged to maintain the vibrator 102 de-energized until the metering and injecting device 26 reaches the position illustrated in FIG. 3. At this point the vibrator 102 can be energized by the control circuit to apply the vibrations in the direction of the arrow A directly to the second piston 70 as it advances to the position illustrated in FIG. 4 to expel the wicking material from the cavity 86. At this point the vibrator 102 can be de-energized and the cylinder 80 reversed to retract the pistons to the position illustrated in FIGS. 1 and 2.

By directly connecting the vibrator 102 to the second piston 70 as described above, the forward end of the second piston 70 is vibrated a large number of cycles as the piston 70 is advanced and during each cycle of vibration the end of the piston strikes the wicking material and is positively retracted therefrom. It has been found that this alternate direct striking and retracting of the end of the piston as it expels the material from the cavity provides a surprisingly unexpected improvement in the extrusion of the material from the cavity 86.

Referring to FIG. 6 another embodiment of the invention is shown in which the metering and injecting device 26 is eliminated. In this embodiment the hopper 12 and auger 18 are provided as before but are mounted directly on an electromagnetic vibrator 110 resiliently mounted on a supporting base 112. The outlet conduit 24 communicating with the discharge end of the auger 18 is connected to a pipe 114 which, in turn, is connected directly to the injection nozzle 56 which is mounted on a supporting plate 116. With this arrangement the extrudable wicking material is continuously vibrated as the auger is intermittently rotated through predetermined angles by the motor 20 and clutch 22 to inject metered amounts of the wicking material into the bearing 89.

In the embodiment of FIG. 6 the injection nozzle 56 has the same small outlet orifice 68 as illustrated in FIGS. 1–4 which builds up a back pressure against the passage of the wicking material therethrough. Therefore the auger 18 must exert a sufficient pressure on the wicking material to overcome this back pressure and to completely fill the lubricant reservoir 94 within the bearing 89. The vibration provided by the vibrator 110 prevents clogging and separation of the oil from the fibers as this pressure is applied so that the same uniform mixture of fibers and oil is injected into the bearing cavity as is stored in the hopper 12.

Prior to the present invention, augers and hoppers for handling dry, powdery material have been vibrated to prevent sticking in the hopper or the auger. However, this material was merely discharged by gravity from the end of the auger as opposed to the present invention which employs the vibrating auger in combination with the closed system to the injection nozzle in which the material is pressurized.

While it will be apparent that the embodiments of the invention herein disclosed are well calculated to fulfill the objects of the invention, it will be appreciated that the invention is susceptible to variation, modification and change without departing from the proper scope or fair meaning of the subjoined claim.

What is claimed is:

The method of extruding oil-impregnated fibers into a bearing having a lubricant reservoir therein, which includes the steps of, delivering said oil-impregnated fibers to an extruding device having an outlet orifice, communicating said bearing lubricant reservoir with said outlet orifice, extruding the oil-impregnated fibers in said extruding device through said outlet orifice into said bearing reservoir, and vibrating the oil-impregnated wicking material as it is being extruded.

References Cited by the Examiner

UNITED STATES PATENTS

| | | |
|---|---|---|
| 2,026,782 | 1/1936 | Gouverneur. |
| 2,334,228 | 11/1943 | Stevermann 264—69 X |
| 2,366,417 | 1/1945 | MacMillin. |
| 2,408,627 | 10/1946 | Green. |
| 2,434,271 | 1/1948 | Howatt. |
| 2,480,313 | 8/1949 | Alden. |
| 2,765,153 | 10/1956 | Gillow et al. |
| 2,802,237 | 8/1957 | Davis. |
| 2,890,491 | 6/1959 | Hendry. |
| 3,002,614 | 10/1961 | Jones. |
| 3,025,567 | 3/1962 | Sherman. |

ROBERT F. WHITE, *Primary Examiner.*

L. S. SQUIRES, *Assistant Examiner.*